(12) United States Patent  
Sato (10) Patent No.: US 12,098,588 B2  
(45) Date of Patent: Sep. 24, 2024

(54) GLASS UNIT

(71) Applicant: Nippon Sheet Glass Company, Limited, Tokyo (JP)

(72) Inventor: Toshiyuki Sato, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 473 days.

(21) Appl. No.: 17/284,372

(22) PCT Filed: Oct. 11, 2019

(86) PCT No.: PCT/JP2019/040141  
§ 371 (c)(1),  
(2) Date: Apr. 9, 2021

(87) PCT Pub. No.: WO2020/075833  
PCT Pub. Date: Apr. 16, 2020

(65) Prior Publication Data  
US 2021/0388667 A1 Dec. 16, 2021

(30) Foreign Application Priority Data  
Oct. 12, 2018 (JP) .................................. 2018-193907

(51) Int. Cl.  
*E06B 3/67* (2006.01)  
*C03C 27/10* (2006.01)  
(Continued)

(52) U.S. Cl.  
CPC .............. *E06B 3/677* (2013.01); *C03C 27/10* (2013.01); *E06B 3/6612* (2013.01); *E06B 3/67* (2013.01)

(58) Field of Classification Search  
CPC .......... E06B 3/677; E06B 3/6612; E06B 3/67; C03C 27/10  
(Continued)

(56) References Cited

U.S. PATENT DOCUMENTS

2004/0253395 A1 12/2004 Amari et al.  
2006/0175767 A1* 8/2006 Collins ................. E06B 3/6612  
277/653

(Continued)

FOREIGN PATENT DOCUMENTS

CN 1575263 A 2/2005  
CN 102079620 A 6/2011  
(Continued)

OTHER PUBLICATIONS

International Search Report for PCT/JP2019/040141 (PCT/ISA/210) mailed on Jan. 7, 2020.  
(Continued)

*Primary Examiner* — Mark R Wendell  
(74) *Attorney, Agent, or Firm* — Birch, Stewart, Kolasch & Birch, LLP (57) ABSTRACT

A glass unit according to the present invention includes a first glass plate having a through hole formed therein, a second glass plate that is arranged facing the first glass plate at a predetermined interval therefrom and forms an internal space with the first glass plate, a sealing member that seals a gap at peripheral edges of the first glass plate and the second glass plate, a cover that closes the through hole, and an adhesive that fixes the cover to the first glass plate. The internal space has been depressurized to a vacuum state, or a predetermined gas has been injected into the internal space, and the first glass plate and the cover are fixed by the adhesive.

19 Claims, 5 Drawing Sheets

(51) Int. Cl.
*E06B 3/66* (2006.01)
*E06B 3/677* (2006.01)

(58) Field of Classification Search
USPC .................................................. 52/204.5
See application file for complete search history.

(56) References Cited

U.S. PATENT DOCUMENTS

| | | |
|---|---|---|
| 2012/0285199 A1 | 11/2012 | Li et al. |
| 2012/0321821 A1 | 12/2012 | Li et al. |
| 2012/0321822 A1 | 12/2012 | Li |
| 2013/0004685 A1 | 1/2013 | Li et al. |
| 2013/0202820 A1 | 8/2013 | Li et al. |
| 2013/0302542 A1* | 11/2013 | Jones ................ E06B 3/6612 428/34 |
| 2017/0002603 A1 | 1/2017 | Veerasamy et al. |
| 2018/0319707 A1* | 11/2018 | Ishibashi ................ C03C 27/10 |
| 2020/0040644 A1* | 2/2020 | Hasegawa ............... C03C 27/06 |
| 2020/0123040 A1* | 4/2020 | Lian ...................... E06B 3/6775 |
| 2021/0388667 A1* | 12/2021 | Sato ...................... E06B 3/6612 |

FOREIGN PATENT DOCUMENTS

| | | | |
|---|---|---|---|
| EP | 3 170 799 A1 | 5/2017 | |
| GB | 2528634 A | 2/2016 | |
| JP | 2001-64042 A | 3/2001 | |
| JP | 2003-137612 A | 5/2003 | |
| JP | 3096372 U | 9/2003 | |
| JP | 2014-88316 A | 5/2014 | |
| JP | 2017-141136 A | 8/2017 | |
| KR | 10-2013-0022535 A | 3/2013 | |
| WO | WO 2016/009948 A1 | 1/2016 | |
| WO | WO 2017/003659 A1 | 1/2017 | |

OTHER PUBLICATIONS

Written Opinion of the International Searching Authority for PCT/JP2019/040141 (PCT/ISA/237) mailed on Jan. 7, 2020.
Chinese Office Action for Chinese Application No. 201980067280.9, dated Feb. 10, 2023, with English translation.
Extended European Search Report for European Application No. 19871286.1, dated May 30, 2022.
Japanese Office Action for Japanese Application No. 2018-193907, dated May 17, 2022, with English translation.
Chinese Office Action and Search Report for Chinese Application No. 201980067280.9, dated Jun. 15, 2022, with English translation of Chinese Office Action.
Japanese Office Action for Japanese Application No. 2018-193907, dated Dec. 12, 2023, with English translation.
Kan, "Special feature / Metal and glass with low-melting point glasses," Magazine "Metal," Alar Technology Center, vol. 45, No. 6, 1975, pp. 56-57.

* cited by examiner

GLASS UNIT

TECHNICAL FIELD

The present invention relates to a glass unit and a method for manufacturing the same.

BACKGROUND ART

In recent years, glass units formed using multiple layers of glass have often been adopted for windowpanes in buildings and the like. Such glass units have an internal space formed between two or more glass plates for the purpose of improving heat insulation in a room. There are various types of such glass units, and a glass unit has been proposed in which the internal space is depressurized to a vacuum state in order to further enhance the heat insulating effect (e.g., Patent Literature 1).

CITATION LIST

Patent Literature

Patent Literature 1: JP 2017-141136A

SUMMARY OF INVENTION

Technical Problem

Here, in the glass unit of Patent Literature 1, a through hole is formed in one of the glass plates, the internal space is depressurized through the through hole, and then the through hole is sealed using a cover made of glass. At this time, the contact portion between the inner peripheral edge of the through hole and the cover is irradiated with a laser beam in order to join the cover to the through hole.

However, with this method, irradiation with the laser beam generates localized heat in the glass cover, which may cause the cover to crack. Irradiation with a laser beam also has a problem that the apparatus becomes large in size.

The present invention has been made to solve such problems, and an object of the present invention is to provide a glass unit that can prevent cracking of the cover while also being manufactured easily, as well as a method for manufacturing the same.

Solution to Problem

1. A glass unit including:
a first glass plate having a through hole formed therein;
a second glass plate that is arranged facing the first glass plate at a predetermined interval therefrom and forms an internal space with the first glass plate;
a sealing member that seals a gap at peripheral edges of the first glass plate and the second glass plate;
a cover that closes the through hole; and
an adhesive that fixes the cover to the first glass plate,
wherein the internal space has been depressurized to a vacuum state, or a predetermined gas has been injected into the internal space, and
the first glass plate and the cover are fixed by the adhesive.
2. The glass unit according to item 1,
wherein the through hole has a small diameter portion and a large diameter portion that are continuous with each other in an axial direction,
the small diameter portion is arranged on a side corresponding to the internal space, and
the cover is fixed on a step between the large diameter portion and the small diameter portion via the adhesive.
3. The glass unit according to item 2,
wherein the cover is accommodated in the large diameter portion, and
a surface of the cover and a surface of the first glass plate are substantially flush with each other.
4. The glass unit according to item 2,
wherein the cover is accommodated in the large diameter portion, and
a surface of the cover is located inward of a surface of the first glass plate.
5. The glass unit according to any of items 2 to 4,
wherein an inner diameter of the large diameter portion is in a range of 5 mm to 15 mm inclusive.
6. The glass unit according to any of items 2 to 5,
wherein a difference in diameter between the small diameter portion and the large diameter portion is 3 to 20 mm.
7. The glass unit according to any of items 2 to 6,
wherein a difference between a depth of the large diameter portion and a thickness of the cover is in a range of 0.4 mm to 0.7 mm inclusive.
8. The glass unit according to any of items 1 to 8,
wherein the adhesive contains a low melting point glass.
9. The glass unit according to any of items 1 to 8,
wherein a difference between a coefficient of thermal expansion of the first glass plate and a coefficient of thermal expansion of the adhesive is $20 \times 10^{-7}/°$ C. or less.
10. The glass unit according to any of items 1 to 9,
wherein the cover is formed by glass, and
the cover and the first glass plate have the same coefficient of thermal expansion.
11. The glass unit according to any of items 1 to 10, further including:
an interlayer film and a third glass plate that are stacked on the first glass plate,
wherein laminated glass is constituted by the first glass plate, the interlayer film, and the third glass plate.
12. The glass unit according to any of items 1 to 8,
wherein the adhesive contains a bismuth-based low melting point glass.
13. The glass unit according to item 10,
wherein the adhesive is non-crystalline.
14. The glass unit according to item 10,
wherein the adhesive is crystalline.
15. The glass unit according to item 12,
wherein the sealing member is formed by a non-crystalline low melting point glass.
16. The glass unit according to item 12,
wherein the sealing member and the adhesive are formed by metal solder.
17. The glass unit according to any of items 11 to 14,
wherein at least one of the first glass plate and the second glass plate is formed by tempered glass.
18. The glass unit according to item 17,
wherein the second glass plate is formed by tempered glass.
19. The glass unit according to any of items 17 to 18,
wherein the tempered glass is chemically strengthened glass.
20. The glass unit according to any of items 1 to 19, further including:
a peripheral member that is attached to peripheral edges of the first glass plate and the second glass plate and is formed with a U-shaped cross-section including a first portion that is in contact with the first glass plate, a second portion that is in contact with the second glass plate, and a connecting portion that connects the first portion and the second portion, wherein the first portion is arranged so as to cover the cover.

21. The glass unit according to any of items 1 to 19, further including:

a peripheral member that is attached to peripheral edges of the first glass plate and the second glass plate and is formed with a U-shaped cross-section including a first portion that is in contact with the first glass plate, a second portion that is in contact with the second glass plate, and a connecting portion that connects the first portion and the second portion, wherein the cover is arranged at a position not covered by the first portion.

22. A glass unit manufacturing method including the steps of:

preparing a first glass plate having a through hole formed therein, the through hole having a small diameter portion and a large diameter portion that are continuous with each other in an axial direction;

arranging a second glass plate so as to face a small diameter portion side of the first glass plate at a predetermined interval from the first glass plate;

arranging a sealing material in a gap between peripheral edges of the first glass plate and the second glass plate;

arranging a cover on a step between the large diameter portion and the small diameter portion via an adhesive arranged on the step, so as to close the through hole while also forming a passage for air between the through hole, the adhesive, and the cover;

arranging a weight to press the cover;

forming a sealing member that seals the gap between the peripheral edges by heating the sealing material and then cooling the sealing material so as to solidify;

depressurizing an internal space between the first glass plate and the second glass plate through the passage for air; and closing the through hole with the cover by heating the adhesive so as to soften.

23. The glass unit manufacturing method according to item 22, wherein the step of depressurizing the internal space starts during cooling of the sealing material.

24. The glass unit manufacturing method according to item 22 or 23, wherein the cover is accommodated in the large diameter portion, and after the softened adhesive is cooled, a surface of the cover is arranged at a position substantially flush with a surface of the first glass plate, or at a position recessed below the surface of the first glass plate.

25. The glass unit manufacturing method according to any of items 22 to 24, further including the step of:

arranging a protective plate that covers the cover prior to arrangement of the weight, wherein the weight presses the cover via the protective plate such that the cover can be seen from outside through the protective plate.

26. The glass unit manufacturing method according to item 25, wherein the protective plate is made of quartz glass.

27. The glass unit manufacturing method according to any of items 22 to 26, wherein before being heated, the adhesive is arranged on the step in a discontinuous shape having at least one gap.

28. The glass unit manufacturing method according to any of items 22 to 27, wherein the adhesive is a bismuth-based solder.

29. The glass unit manufacturing method according to any of items 22 to 28, wherein the cover is arranged on the first glass plate after the adhesive has been attached to the cover.

30. The glass unit manufacturing method according to item 29, the adhesive is attached to the cover by temporary firing.

31. The glass unit manufacturing method according to any of items 22 to 30, wherein a thickness of the adhesive is less than or equal to 0.2 mm, and the adhesive is attached to the cover by printing.

Advantageous Effects of Invention

According to the present invention, it is possible to prevent cracking of the cover while also facilitating manufacturing.

DESCRIPTION OF EMBODIMENTS 1.1. Overview of Glass Unit

Figure 1:
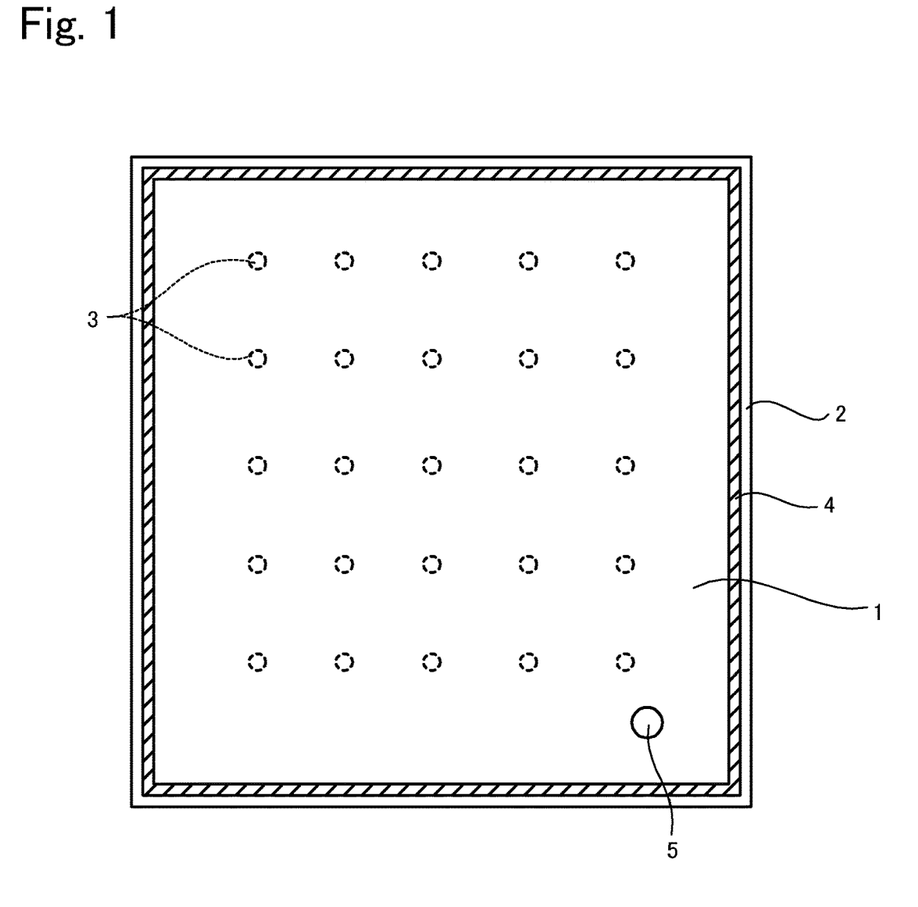
FIG. 1 is a plan view showing an example of a glass unit according to the present invention.
Figure 2:
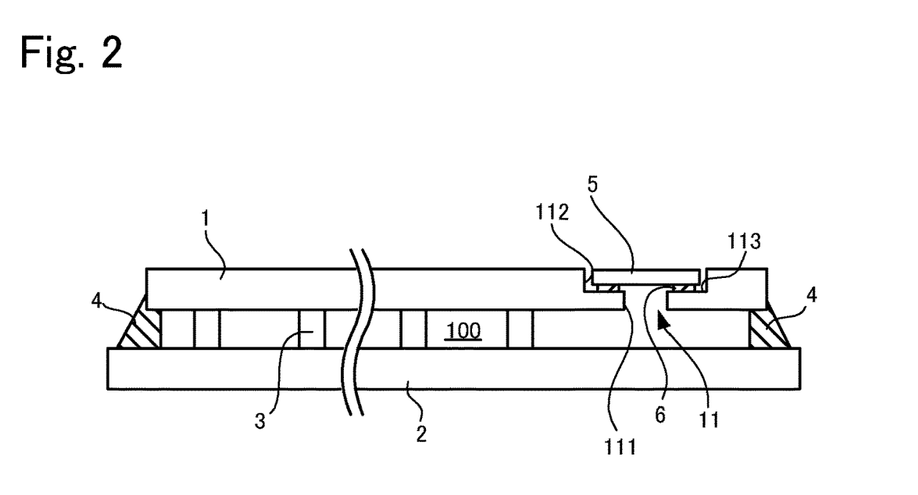
FIG. 2 is a cross-sectional view of FIG. 1.

Hereinafter, an embodiment of a glass unit according to the present invention will be described with reference to the drawings. FIG. 1 is a plan view of the glass unit according to the present embodiment, and FIG. 2 is a cross-sectional view of FIG. 1. As shown in FIGS. 1 and 2, the glass unit according to the present embodiment includes two rectangular glass plates, namely a first glass plate 1 and a second glass plate 2. In the present embodiment, the second glass plate 2 shown on the lower side in FIG. 2 is formed slightly larger than the first glass plate 1. A plurality of spacers 3 are arranged between the two glass plates 1 and 2, and the spacers 3 form a gap at predetermined intervals between the two glass plates 1 and 2. Also, the gap between the peripheral edges of the two glass plates 1 and 2 is sealed by a sealing member 4, thus forming a sealed internal space 100 between the two glass plates 1 and 2. Also, a through hole 11 is formed in the first glass plate 1, and a plate-shaped cover 5 for sealing the through hole 11 is provided. The cover 5 is fixed to the first glass plate 1 via an adhesive 6. Hereinafter, the various members will be described.

2.1. First Glass Plate and Second Glass Plate

There are no particular limitations on the material constituting the first glass plate 1, and a known glass plate can be used. For example, depending on the application, it is possible to use various types of glass plates constituted by template glass, frosted glass given a light diffusing function through surface treatment, wired glass, a wire-reinforced glass plate, tempered glass, double-strengthened glass, low-reflection glass, a highly transparent glass plate, a ceramic glass plate, special glass having a heat ray or ultraviolet absorbing function, or a combination of the aforementioned types. The thickness of the first glass plate 1 is not particularly limited, but is preferably 0.3 to 15 mm, or more preferably 0.5 to 8 mm, for example.

The above-mentioned through hole 11 is formed in an end portion of the first glass plate 1. The through hole 11 has a small diameter portion 111 arranged on the internal space 100 side and a large diameter portion 112 that is continuous with the small diameter portion 111 and is open to the outside. The small diameter portion 111 and the large diameter portion 112 are formed in a coaxial cylindrical shape, and the inner diameter of the large diameter portion 112 is larger than that of the small diameter portion 211. Therefore, an annular step 113 that faces the outside is formed between the large diameter portion 112 and the small diameter portion 111.

The inner diameter of the small diameter portion 111 can be, for example, 1.0 to 3.0 mm. On the other hand, the inner diameter of the large diameter portion 112 is larger than that of the small diameter portion 111, and can be 5 to 15 mm. Setting the inner diameter to 5 mm or more makes it possible to accordingly ensure the small diameter portion 111, and therefore air can be efficiently discharged when the internal space 100 is evacuated, as will be described later. Also, as will be described later, it is possible to ensure space for the step 113 on which the adhesive 6 is placed, thereby preventing the adhesive 6 from blocking the small diameter portion 111 before melting. On the other hand, setting the inner diameter to 15 mm or less enables making the through hole 11 inconspicuous.

Also, the difference in diameter between the large diameter portion 112 and the small diameter portion 111 can be, for example, 3 to 20 mm. Setting the diameter difference to 3 mm or more makes it possible to appropriately ensure space for arranging the adhesive 6, as will be described later. Also, if the difference in diameter is too large, the appearance will be poor, and therefore it is preferable to set the upper limit to 20 mm.

Also, the depth of the large diameter portion 112, that is to say the length in the axial direction, can be set to 0.5 to 1.5 mm, for example.

The second glass plate 2 can be formed from the same material as the first glass plate 1. As described above, the second glass plate 2 is slightly larger than the first glass plate 1, the sealing member 4 mentioned above is arranged at the peripheral edge portion of the second glass plate 2 that protrudes beyond the first glass plate 1, and the gap between the peripheral edges of the two glass plates 1 and 2 is sealed by the sealing member 4.

Also, the glass plates 1 and 2 may each be a glass plate that has been strengthened by chemical strengthening, air-cooled strengthening, or the like. In particular, since the second glass plate 2 is not provided with through holes, it is possible to prevent the extent of strengthening from decreasing in the later-described step for heating the sealing member and the adhesive, and therefore performing strengthening is preferable. Although air-cooled strengthening is more advantageous than chemical strengthening from the viewpoint of cost, the extent of strengthening may decrease in the later-described step for heating the sealing member 4 and the adhesive 6. On the other hand, chemical strengthening can suppress a decrease in the extent of strengthening even in the heating step.

Note that the spacers 3 arranged between the two glass plates 1 and 2 are for maintaining a constant distance between the two glass plates 1 and 2, and known transparent or translucent spacers can be used. The distance between the two glass plates 1 and 2, that is to say the thickness of the internal space 100, can be 0.1 to 2.0 mm, for example.

3. Cover

The cover 5 is formed in a disk shape, and the outer diameter thereof is smaller than that of the large diameter portion 112 of the through hole 11 of the first glass plate 1 and larger than that of the small diameter portion 111. Therefore, the cover 5 is arranged on the step 113 between the large diameter portion 112 and the small diameter portion 111. As will be described later, air is sucked from between the cover 5 and the through hole 11 in a depressurizing step, and therefore a gap is required between the outer peripheral surface of the cover 5 and the inner peripheral surface of the large diameter portion 112. For this reason, it is preferable that the cover 5 has an outer diameter that is 0.2 to 1.5 mm mm smaller than the inner diameter of the large diameter portion 112.

Also, the thickness of the cover 5 is smaller than the depth of the large diameter portion 112, and the difference between the depth of the large diameter portion 112 and the thickness of the cover 5 is preferably 0.4 to 0.7 mm, for example. As will be described later, the upper surface of the cover 5 is arranged on substantially the same plane as the upper surface of the first glass plate 1, and therefore the difference between the depth of the large diameter portion 112 and the thickness of the cover 5 is equal to the thickness of adhesive 6 mentioned above. Accordingly, if this difference is smaller than 0.4 mm for example, the thickness of the adhesive 6 decreases, and therefore there is a risk of a decrease in the adhesive strength. On the other hand, if this difference is larger than 0.7 mm, the thickness of the adhesive 6 increases, but with this configuration, the heat for later-described melting of the adhesive 6 is not uniformly transferred to the adhesive 6, and there is a risk of a decrease in the adhesive strength. Also, the thickness of the cover 5 or the thickness of the first glass plate 1 decreases, which can possibly lead to cracking.

There are no particular limitations on the material constituting the cover 5 as long as it is non-breathable and has a melting point higher than the heating temperature at which the adhesive 6 and the sealing member 4 are melted, but it is preferable that the cover 5 is formed using a material that has the same coefficient of thermal expansion as the first glass plate 1, and it is particularly preferable to use the same material as the first glass plate 1. Accordingly, the difference in thermal expansion between the cover 5 and the adhesive 6 and the difference in thermal expansion between the first glass plate 1 and the adhesive 6 can be made the same, and it is possible to prevent the first glass plate 1 and the cover 5 from cracking in the later-described manufacturing process.

4. Adhesive

There are no particular limitations on the adhesive 6 as long as the cover 5 can be adhered to the first glass plate 1, but for example, an adhesive containing low melting point glass or metal solder can be used. The low melting point glass can be lead-based, tin phosphate-based, bismuth-based, or vanadium-based, for example. The low melting point glass can contain a filler or the like as an additive. Also, the low melting point glass may be either crystalline or non-crystalline. A non-crystalline low melting point glass foams in the depressurizing step as described later, but can easily fix the cover 5 due to having good fluidity. On the other hand, a crystalline low melting point glass is not likely to foam in the depressurizing step and therefore has high sealing performance, but may have low fluidity.

Non-crystalline vanadium-based low melting point glass is easy to handle because it has a low melting point, but when used at high temperatures, it may become difficult to handle because part of it crystallizes and the coefficient of thermal expansion increases. On the other hand, non-crystalline bismuth-based low melting point glass has a higher melting point than vanadium-based low melting point glass, but has an advantage of being easy to handle because it is less likely to crystallize even at high temperatures.

The low melting point here means, for example, a melting point of 500° C. or lower. If the melting point of the adhesive 6 is greater than 500° C., the heating time in a later-described heater 92 may become long and the productivity may decrease. Also, if the melting point is too low, the adhesive 6 melts when the sealing member 4 is melted as described later, and the through hole 11 becomes closed. For this reason, it is preferable to have a melting point that is, for example, 10 to 50° C. higher than the melting point of the sealing member 4.

Also, the adhesive 6 is melted and then cooled and allowed to solidify as will be described later, and in order to prevent the first glass plate 1 from cracking due to shrinkage of the adhesive 6 during solidification, it is preferable that the difference between the coefficient of thermal expansion of the first glass plate 1 and the coefficient of thermal expansion of the adhesive 6 is $20 \times 10^{-7}$ mm/° C. or less when the temperature is raised from room temperature to 300° C. for example. Note that if the adhesive 6 contains glass as described above, the difference in the coefficient of thermal expansion can be particularly small due to having the same quality as the first glass plate 1 that is the adhesion target. Accordingly, when the adhesive 6 is heated and fixed for example, the difference in the coefficient of thermal expansion from that of the first glass plate 1 is small, and therefore cracking can be suppressed.

The thickness of the adhesive 6 is set to the difference between the depth of the large diameter portion 112 and the thickness of the cover 5 when the final product is obtained. As will be described later, the adhesive 6 is heated so as to melt and then cooled so as to solidify. For this reason, the thickness of the adhesive 6 before heating can larger than that after heating. Also, when the adhesive 6 is heated and melted, there are also cases where the adhesive 6 expands due to the ingress of air, for example. In such a case, the thickness of the adhesive 6 before heating can be smaller than that after heating.

Also, the adhesive 6 may be directly provided on the step 113 of the through hole 11, or a configuration is possible in which it is provided on the cover 5 in advance, and then the cover 5 is attached to the through hole 11. In this case, the adhesive 6 can be fixed to the cover 5 by temporary firing. For example, if bismuth-based low melting point glass is used as the adhesive 6, it can be temporarily fired at about 420 to 460° C. Alternatively, it can be attached to the cover 5 by printing with use of an inkjet or the like. In the case of printing, the thickness of the adhesive 6 can be 0.2 mm or less, for example.

Figure 3:
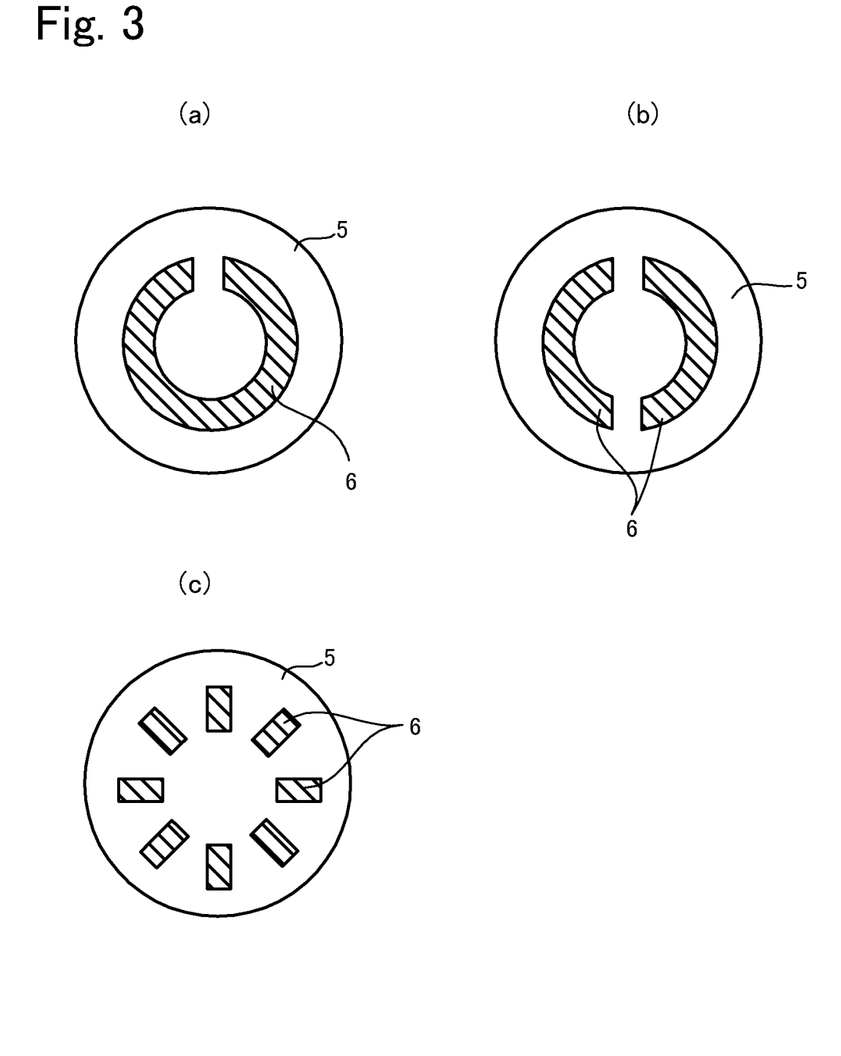
FIG. 3 is a plan view showing an example of a cover on which an adhesive is provided.

The position and shape of the adhesive 6 need only be set to allow arrangement on the step 113 of the through hole 11, but it is particularly preferable to form the adhesive 6 in an annular shape. Note that in order to ensure an air passage in the depressurizing step as will be described later, it is preferable to use a discontinuous annular shape having at least one gap, such as a C-shape ((a) in FIG. 3), a combination of arcs arranged at intervals ((b) in FIG. 3), or lines arranged radially ((c) in FIG. 3).

5. Sealing Member

The sealing member 4 can be formed using the same material as that of the adhesive 6. For example, it is preferable to use non-crystalline low melting point glass as the sealing member 4 because the fluidity is high and the sealing member 4 can easily flow in the gap between the two glass plates 1 and 2. In this case, in order to improve the sealing performance, it is preferable that the sealing member 4 extends 2 to 7 mm inward from the end surface of the first glass plate 1, for example. The upper limit is 7 mm.

As described above, low melting point glass or metal solder can be used as the sealing member 4, but if the manufacturing process described later is adopted, the melting point of the adhesive 6 needs to be higher than the melting point of the sealing member 4. For example, if both the adhesive 6 and the sealing member 4 are the same type of low melting point glass, the amount of low melting point glass and the amount of the additive filler of the adhesive 6 can be adjusted in order to set the melting point higher than the melting point of the sealing member 4.

From this point of view, is low melting point glass is used as the sealing member 4 for example, metal solder having a lower melting point than the low melting point glass cannot be used as the adhesive 6. On the other hand, although metal solder can be used as both the sealing member 4 and the adhesive 6, it is necessary to adjust the adhesive 6 so that the melting point is higher as described above.

6. Glass Unit Manufacturing Method

Figure 4:
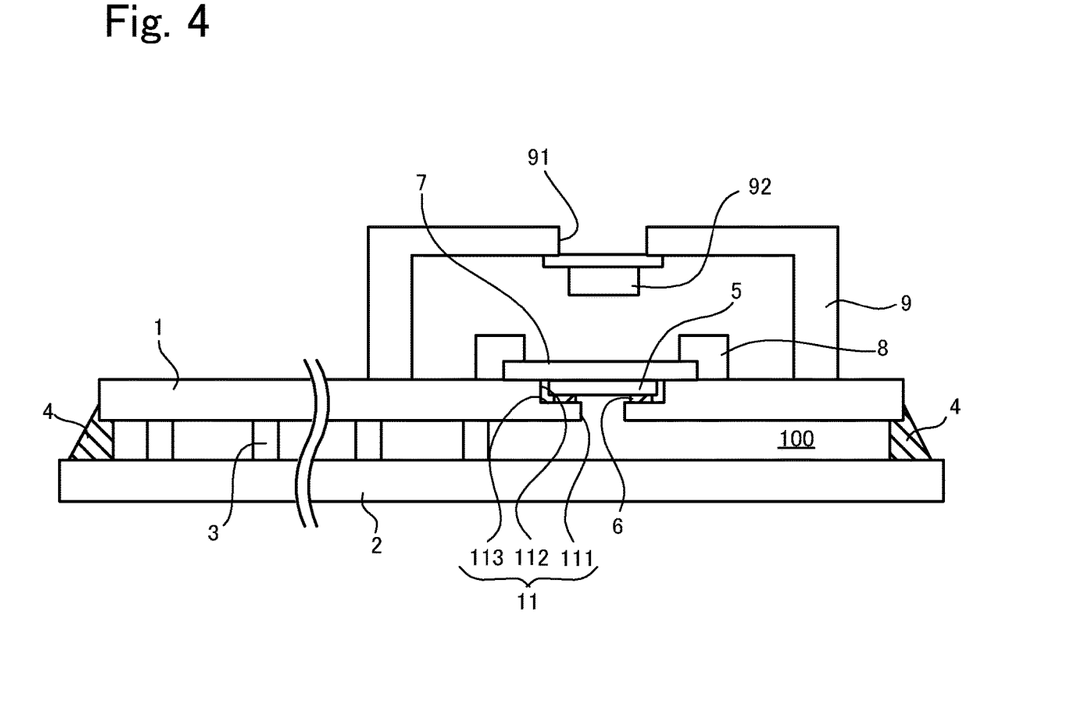
FIG. 4 is a schematic cross-sectional view showing a manufacturing process for the glass unit of FIG. 1.

Next, a method for manufacturing the glass unit will be described. First, the structure shown in FIG. 4 is assembled. Specifically, the first glass plate 1 provided with the through hole 11 as described above and the second glass plate 2 are prepared. Next, the spacers 3 are arranged on the second glass plate 2, and then the first glass plate 1 is arranged on the spacers 3.

A sealing material 40 is then arranged on the peripheral edge of the second glass plate 2 so as to close the gap between the peripheral edges of the two glass plates 1 and 2. This corresponds to the sealing member 4 before it melts and solidifies.

Also, as described above, the C-shaped adhesive 6 is attached to one surface of the cover 5 by temporary firing or the like. Then, the cover 5 is attached to the through hole 11 of the first glass plate 1. At this time, the adhesive 6 is arranged on the step 113 of the through hole 11. Subsequently, the disc-shaped protective plate 7, which is larger than the large diameter portion 112 of the through hole 11, is arranged on the cover 5, and a weight 8 is further arranged on the protective plate 7. As a result, the cover 5 is pressed against the step 113 by the weight 8 via the protective plate 7.

Figure 5:
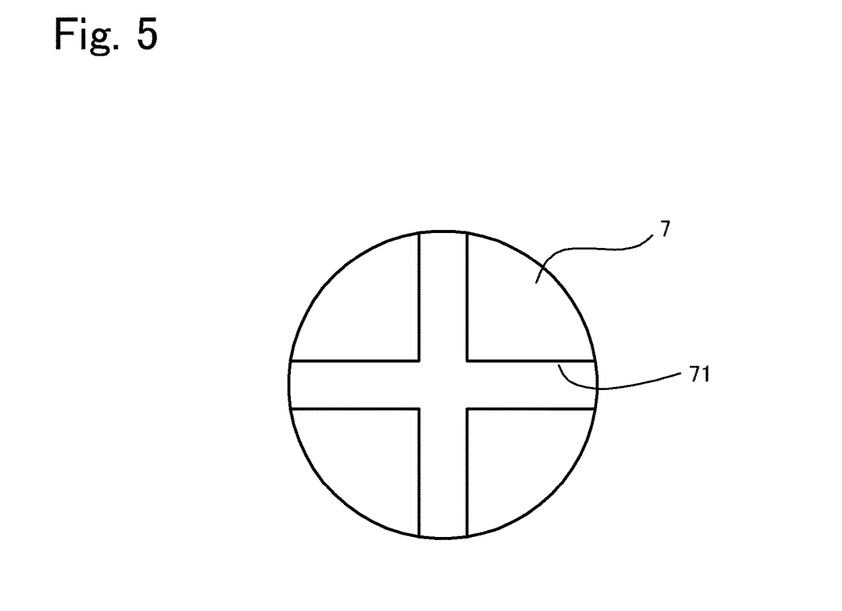
FIG. 5 is a plan view of a protective plate.

At this time, since the adhesive 6 has been temporarily fired and solidified, it is not squashed, and the adhesive 6 forms a gap between the cover 5 and the step 113. Also, as shown in FIG. 5, a cross-shaped groove 71 is formed in the lower surface of the protective plate 7. For this reason, air flows between the internal space 100 of the glass unit and the outside through the small diameter portion 111 of the through hole 11, the discontinuous portion of the adhesive 6, the gap between the large diameter portion 112 and the cover 5, and the groove 71 of the protective plate 7.

As will be described later, due to needing to conduct heat, the protective plate 7 is preferably made of a material that has a low infrared ray absorption rate and a low coefficient of expansion when heated. For example, quartz glass or the same material as the cover 5 and the glass plates 1 and 2 can be used. Note that the protective plate 7 need only be made of a material that does not prevent the adhesive 6 from being heated by radiant heat from a later-described heater 92, and may be transparent or opaque.

The weight 8 can be shaped to press the peripheral edges of the protective plate 7 without blocking the cover 5, and may be formed in a donut shape, for example. Note that the weight 8 needs to have a shape that ensures the above-mentioned air flow path. In other words, it is necessary to have a structure in which the groove 71 of the protective plate 7 is open to the outside.

After arranging the protective plate 7 and the weight 8 in this way, a cup-shaped closing member 9 is attached to the upper surface of the first glass plate 1 so as to cover the protective plate 7 and the weight 8. Accordingly, the space surrounded by the closing member 9, including the through hole 11, is sealed. Also, an opening 91 is formed in the upper portion of the closing member 9, and the opening 91 is connected to a vacuum pump (not shown) to depressurize the internal space. Also, inside the closing member 9, a heater 92 made of tungsten or the like is provided above the protective plate 7, and the adhesive 6 is heated by the heater 92.

After the closing member 9 is attached in this way, the assembly is placed in a heating furnace (not shown) and heated. First, the sealing material 40 is heated to the melting point or above to melt the sealing material 40. The melted sealing material 40 enters the gap between the peripheral edges of the two glass plates 1 and 2. For example, if bismuth-based low melting point glass is used as the sealing material 40, it is heated to around 470° C. Thereafter, the temperature of the heating furnace is lowered to, for example, about 380 to 460° C., and the sealing material 40 is allowed to solidify. Since the heating temperature at this time is lower than the melting point of the adhesive 6, the adhesive 6 does not melt. Therefore, the above-mentioned air flow path is ensured. Note that there are no particular limitations on the means for heating the sealing material 40, and radiant heating, laser heating, induction heating, or the like can be adopted. In particular, if the sealing material 40 is made of a metal, induction heating can be adopted.

Subsequently, the vacuum pump is driven to reduce the pressure. Specifically, the internal space 100 is depressurized via the above-mentioned air flow path. If the pressure in the internal space 100 is 0.1 Pa or less for example, it can be regarded as a vacuum state.

In this depressurizing step, force acts in the direction of bringing the glass plates 1 and 2 closer to each other, and the sealing material 40 is also squashed at the same time. Accordingly, voids inside the sealing material 40 can be eliminated, and therefore the leakage of gas through the sealing member 4 can be prevented. Accordingly, depressurization is preferably started at a temperature before the sealing material has completely solidified, and the temperature for solidification of the sealing material described above (380 to 460° C. in the above example) can be determined in consideration of this. For example, depressurization can be performed when the temperature becomes 50 to 150° C. lower than the melting point of the sealing material 40. Note that if metal solder is used as the sealing material 40 for example, the sealing material 40 can be allowed to solidify regardless of the above-mentioned range of 380 to 460° C.

Following this, the heater 92 is driven to heat the adhesive 6. If the adhesive 6 is formed of bismuth-based low melting point glass for example, the temperature of the adhesive 6 is raised to about 500° C. by the heater 92. Accordingly, the adhesive 6 melts, and the pressure applied by the weight 8 also helps to squash the adhesive 6. As a result, the C-shaped adhesive 6 deforms in an annular shape, and the cover 5 and the adhesive 6 airtightly seal the small diameter portion 111 of the through hole 11. In this way, the vacuum state of the internal space 100 is maintained. Thereafter, when the driving of the heater 92 is stopped and the whole assembly is slowly cooled, the sealing material 40 completely solidifies and forms the sealing member 4 that seals the gap between the peripheral edges of both glass plates 1 and 2. The above steps obtain the glass unit. Note that a device other than the heater 92 described above may be used as long as the adhesive 6 can be heated.

7. Features

As described above, according to the present embodiment, effects described below can be obtained.

(1) Because the cover 5 is fixed to the first glass plate 1 with use of the adhesive 6, a difference in temperature distribution is less likely to occur in the first glass plate 1 or the cover 5 than in the case where the cover is directly irradiated with a laser beam as in conventional examples, and thus cracking can be prevented. Also, a large device for emitting the laser beam is not required, and the depressurization of the internal space 100 and the closing of the through hole 11 can be performed easily.

(2) If non-crystalline low melting point glass is used as the adhesive 6, the handling thereof, such as control of the fluidity, is easier, and the through hole 11 can be reliably closed by the cover 5. On the other hand, non-crystalline low melting point glass may foam during depressurization, but such foaming is suppressed due to the adhesive 6 being sandwiched between the cover 5 and the step 113. For this reason, it is possible to prevent deterioration of the adhesive performance and the leakage of gas from the adhesive 6.

(3) In the above manufacturing process, if the protective plate 7 that covers the entire cover 5 is used, the temperature distribution in the cover 5 can be made substantially uniform during heating with the heater 92. For example, if the cover 5 is pressed directly with the weight 8 without using the protective plate 7, there is a risk that the cover 5 will crack due to a temperature difference between the portion of the cover 5 that is in contact with the weight 8 and the portion not in contact with the weight 8, but using the protective plate 7 makes it possible to prevent such cracking. Note that the protective plate 7 is not essential, and the cover can be pressed merely by the weight 8 with consideration given to the temperature distribution.

8. Variations

Although an embodiment of the present invention has been described above, the present invention is not limited to the above embodiment, and various modifications can be made without departing from the spirit of the present invention. Note that the following variations can be combined as appropriate.

8-1

In the above embodiment, the cover 5 and the surface of the first glass plate 1 are adjusted so as to be substantially flush with each other, but the present invention is not limited to this. Specifically, it is preferable that they are flush, but the cover 5 may be arranged so as to slightly protrude beyond the surface of the first glass plate 1 or to be slightly recessed in the through hole 11. For example, the difference between the surface of the cover 5 and the surface of the first glass plate 1 can be 1.0 mm or less. In particular, if the cover 5 is located inward of the surface of the first glass plate 1, it will not interfere with the attachment of a peripheral member 500 shown in FIG. 7, which will be described later.

Figure 6:
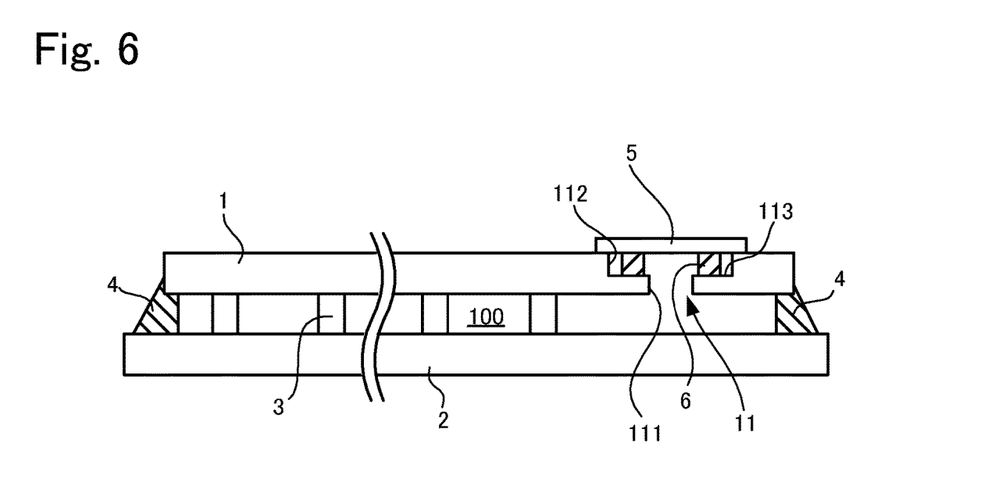
FIG. 6 is a cross-sectional view showing another example of the glass unit according to the present invention.

From this point of view, as shown in FIG. 6 for example, if the cover 5 is thin, the cover 5 can also be arranged on the surface of the first glass plate 1. In this case, it is preferable that the thickness of the cover 5 is 0.3 to 0.6 mm. Also, the adhesive is arranged on the step 113 similarly to the above embodiment, and if the above-described process is adopted, the thickness of the adhesive 6 before heating needs to be greater than the depth of the large diameter portion 112 in order to ensure an air flow path.

8-2

There are no particular limitations on the shape of the through hole 11, and the planar shape may be circular, polygonal, or the like as long as the through hole has the small diameter portion 111 and the large diameter portion 112 so that at least the step 113 as described above is formed. Also, in the case where the cover 5 is accommodated in the large diameter portion 112, the shape may be any shape that can be accommodated in the large diameter portion 112, but there are no particular limitations on the shape if the cover 5 is arranged on the surface of the first glass plate 1 as shown in FIG. 6.

8-3

In the above embodiment, the second glass plate 2 is formed larger than the first glass plate 1, but it may have the same shape. In this case, the sealing member 4 is introduced into the gap between the peripheral edges of both glass plates 1 and 2.

8-4

Figure 7:
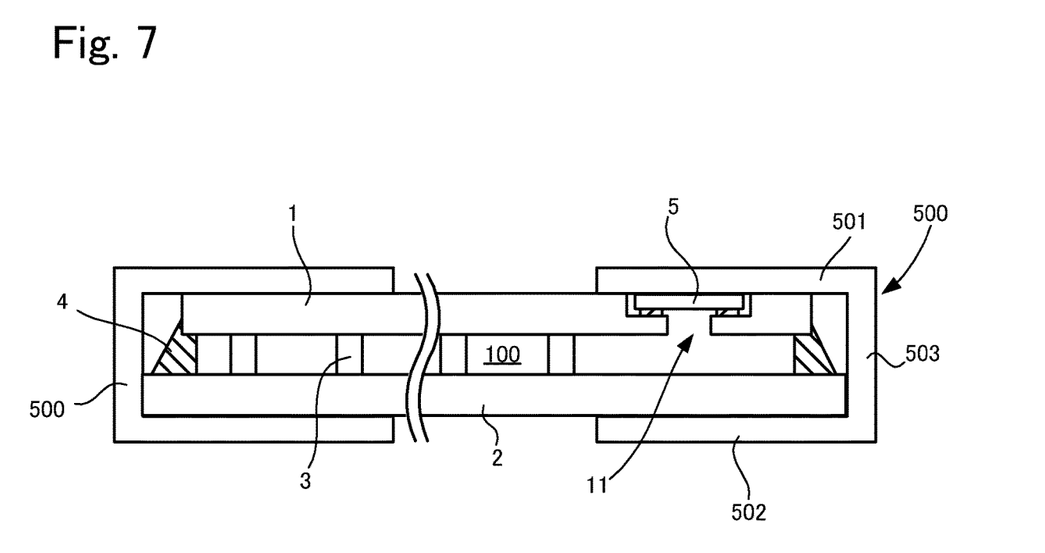
FIG. 7 is a cross-sectional view showing another example of the glass unit according to the present invention.

Peripheral members such as glazing channels that protect peripheral edges can also be attached to peripheral edges of the glass unit. For example, peripheral members 500 shown in FIG. 7 are each formed with a U-shaped cross-section including a plate-shaped first portion 501 that abuts on a peripheral edge of the first glass plate 1, a plate-shaped second portion 502 that abuts on a peripheral edge of the second glass plate 2, and a plate-shaped connecting portion 503 that connects the first portion 501 and the second portion 502. Such peripheral members 500 are fixed to the surfaces or end faces of the glass plates with use of an adhesive, double-sided tape, or the like.

Figure 8:
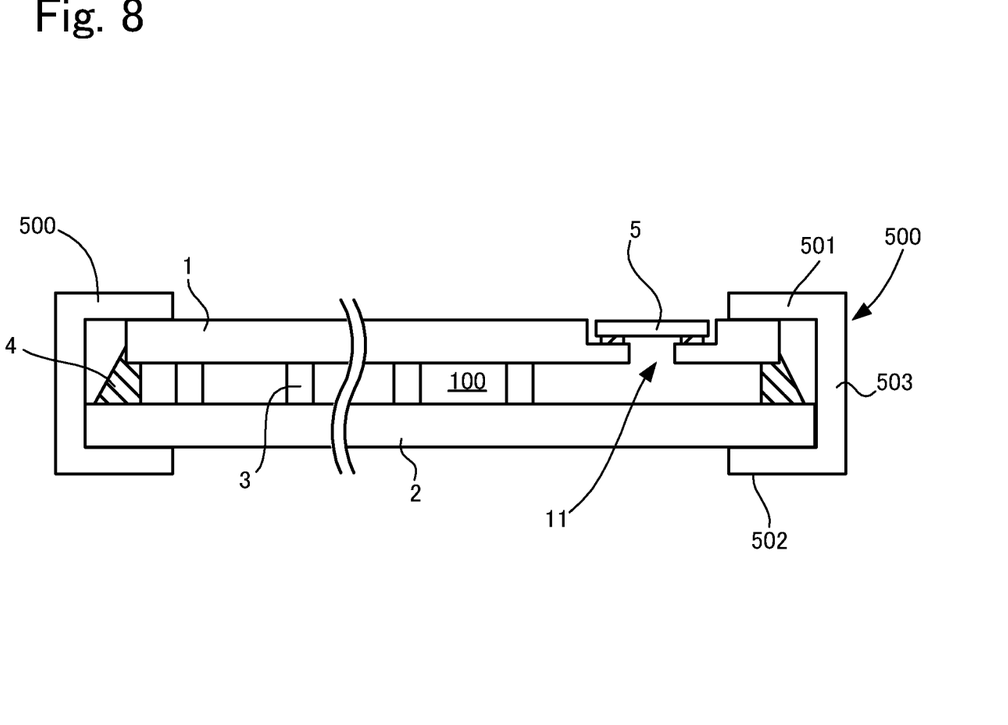
FIG. 8 is a cross-sectional view showing another example of the glass unit according to the present invention.

Also, as shown in FIG. 7, the first portion 501 of the peripheral member 500 can be arranged so as to close the cover 5. This makes it possible to prevent the cover 5 from being seen. Alternatively, as shown in FIG. 8, the first portion 501 can be arranged so as not to block the cover 5. According, when the peripheral member 500 is attached for example, it is possible to prevent the cover 5 from being damaged or removed by the first portion 501.

8-5

After the glass unit has been manufactured as described above, by arranging an interlayer film and a third glass plate on the first glass plate 1 in this order and then fixing them using a known autoclave, it is possible to form laminated glass constituted by the first glass plate 1, the interlayer film, and the third glass plate. The interlayer film can be constituted by a known resin film used for laminated glass, and the third glass plate can be constituted by a glass plate similar to the first glass plate 1.

As described above, if the cover 5 is substantially flush with the surface of the first glass plate 1, the interlayer film 60 and the third glass plate 70 can be stacked without the cover 5 getting in the way. Accordingly, besides using the first glass plate 1 that has been strengthened as described above, by forming laminated glass, the glass unit according to the present invention can be made into safety glass.

8-6

A known Low-E film can also be stacked on at least one of the first glass plate 1 and the second glass plate 2.

8-7

There are various methods for setting a predetermined interval between the two glass plates 1 and 2, and besides providing a plurality of spacers 3 between the two glass plates 1 and 2 as described above, it is also possible to provide spacers in only the peripheral edge portions of the two glass plates 1 and 2.

8-8

In the above embodiment, the internal space between the glass plates 1 and 2 is depressurized to a vacuum state, but instead of depressurization, an inert gas such as argon or xenon can be injected. In this case, the thickness of the internal space 100 is preferably about 5 mm. Also, injecting an inert gas obtains an effect of eliminating the need for the spacers 3. Note that if an inert gas is injected, the heat-shielding performance is slightly lower than in the case of forming the vacuum state, but it is possible to maintain heat-shielding performance that can withstand practical use.

8-9

In the above embodiment, the adhesive 6 is arranged on the step 113 between the large diameter portion 112 and the small diameter portion 111, but the present invention is not limited to this, and the adhesive can also be placed on the entire bottom surface of the cover 5 or on the outer peripheral surface of the cover 5, for example.

8-10

The glass unit of the present invention can be used not only as a window glass for a building where heat shielding performance is required, but also as a cover glass that is to be mounted on the outer surface of a device (e.g., a device such as a refrigerator). Also, either the first glass plate 1 or the second glass plate 2 may be arranged so as to face the outside of the device, the building, or the like to which the glass unit is to be mounted, but because the first glass plate 1 provided with the through hole 11 has a lower strength than the second glass plate 2, it is preferable to arrange the second glass plate 2 so as to face the outside.

8-11

Figure 9:
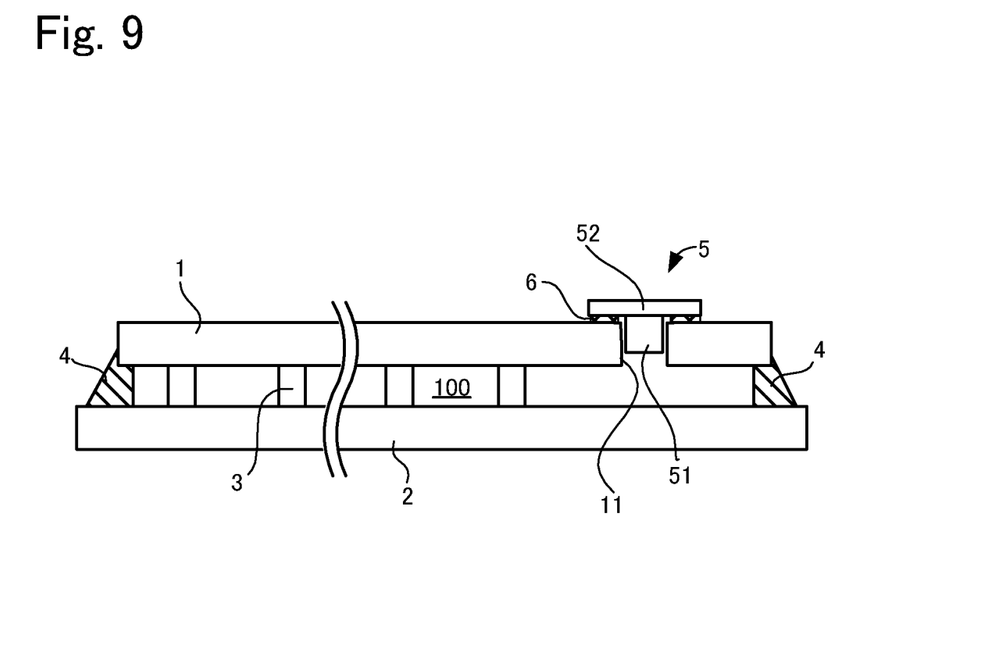
FIG. 9 is a cross-sectional view showing another example of the glass unit according to the present invention.

In the above embodiment, the through hole 11 has a large diameter portion 112 and a small diameter portion 111 that are continuous in the axial direction, but the through hole may have a constant diameter. In this case, as shown in FIG. 9, the cover 5 has a small diameter portion 51 that is inserted into the through hole 11, and a large diameter portion 52 that is arranged on the surface of the first glass plate 1 and has a larger diameter than the through hole 11, and these two portions are integrated with each other. The adhesive 6 is applied to the lower surface of the large diameter portion 52 and adhered to the surface of the first glass plate 1. At this time, in order to ensure an air flow path for depressurization, it is preferable that the small diameter portion 51 is smaller than the inner diameter of the through hole 11, or that a groove is formed in the outer peripheral surface. Also, it is preferable that the adhesive 6 is formed in a C shape in a plan view as described above to ensure an air flow path. Alternatively, the small diameter portion may be omitted, and the cover 5 may be constituted by only the large diameter portion 52.

LIST OF REFERENCE NUMERALS

1 First glass plate
11 Through hole
111 Small diameter portion
112 Large diameter portion
113 Step
2 Second glass plate
4 Sealing member
5 Cover
6 Adhesive

The invention claimed is:

1. A glass unit comprising:
a first glass plate having a through hole formed therein;
a second glass plate that is arranged facing the first glass plate at a predetermined interval therefrom and forms an internal space with the first glass plate;
a sealing member that seals a gap at peripheral edges of the first glass plate and the second glass plate;
a cover that closes the through hole; and
an adhesive that fixes the cover to the first glass plate, wherein
the internal space has been depressurized to a vacuum state, or a predetermined gas has been injected into the internal space,
the through hole has a small diameter portion and a large diameter portion that are continuous with each other in an axial direction,
the small diameter portion is arranged on a side corresponding to the internal space,
only the cover and the adhesive are disposed in the large diameter portion, and
the cover is fixed on a step between the large diameter portion and the small diameter portion via the adhesive.

2. The glass unit according to claim 1, wherein
the cover is accommodated in the large diameter portion, and
a surface of the cover and a surface of the first glass plate are substantially flush with each other.

3. The glass unit according to claim 1, wherein
the cover is accommodated in the large diameter portion, and
a surface of the cover is located inward of a surface of the first glass plate.

4. The glass unit according to claim 1, wherein the adhesive contains a low melting point glass.

5. The glass unit according to claim 1, wherein a difference between a coefficient of thermal expansion of the first glass plate and a coefficient of thermal expansion of the adhesive is $20 \times 10^{-7}/°$ C. or less.

6. The glass unit according to claim 1, wherein
the cover is formed by glass, and
the cover and the first glass plate have the same coefficient of thermal expansion.

7. The glass unit according to claim 1, wherein the adhesive contains a bismuth-based low melting point glass.

8. The glass unit according to claim 6, wherein the adhesive is non-crystalline.

9. The glass unit according to claim 6, wherein the adhesive is crystalline.

10. The glass unit according to claim 7, wherein the sealing member is formed by a non-crystalline low melting point glass.

11. The glass unit according to claim 7, wherein the sealing member and the adhesive are formed by metal solder.

12. The glass unit according to claim 7, wherein at least one of the first glass plate and the second glass plate is formed by tempered glass.

13. The glass unit according to claim 12, wherein the second glass plate is formed by tempered glass.

14. The glass unit according to claim 1, further comprising:
a peripheral member that is attached to peripheral edges of the first glass plate and the second glass plate and is formed with a U-shaped cross-section including a first portion that is in contact with the first glass plate, a second portion that is in contact with the second glass plate, and a connecting portion that connects the first portion and the second portion,
wherein the first portion is arranged so as to cover the cover.

15. The glass unit according to claim 1, further comprising:
a peripheral member that is attached to peripheral edges of the first glass plate and the second glass plate and is formed with a U-shaped cross-section including a first portion that is in contact with the first glass plate, a second portion that is in contact with the second glass plate, and a connecting portion that connects the first portion and the second portion,
wherein the cover is arranged at a position not covered by the first portion.

16. A glass unit manufacturing method comprising the steps of:
preparing a first glass plate having a through hole formed therein, the through hole having a small diameter portion and a large diameter portion that are continuous with each other in an axial direction;
arranging a second glass plate so as to face a small diameter portion side of the first glass plate at a predetermined interval from the first glass plate;
arranging a sealing material in a gap between peripheral edges of the first glass plate and the second glass plate;
arranging a cover on a step between the large diameter portion and the small diameter portion via an adhesive arranged on the step, so as to close the through hole while also forming a passage for air between the through hole, the adhesive, and the cover;
arranging a weight to press the cover;
forming a sealing member that seals the gap between the peripheral edges by heating the sealing material and then cooling the sealing material so as to solidify;
depressurizing an internal space between the first glass plate and the second glass plate through the passage for air; and
closing the through hole with the cover by heating the adhesive so as to soften.

17. The glass unit manufacturing method according to claim 16, wherein the step of depressurizing the internal space starts during cooling of the sealing material.

18. The glass unit manufacturing method according to claim 16, wherein
the cover is accommodated in the large diameter portion, and
after the softened adhesive is cooled, a surface of the cover is arranged at a position substantially flush with a surface of the first glass plate, or at a position recessed below the surface of the first glass plate.

19. The glass unit manufacturing method according to claim 16, wherein the adhesive is a bismuth-based solder.

* * * * *